(No Model.)
T. F. SEERY.
FOUNTAIN OR HYDRAULIC BRUSH.
No. 352,009. Patented Nov. 2, 1886.
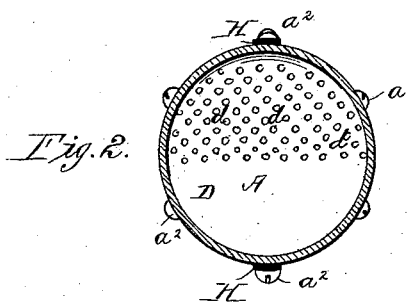
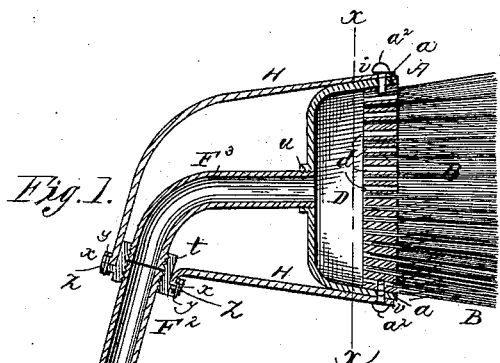
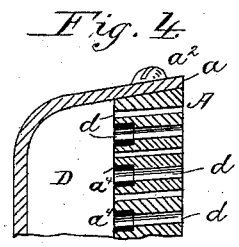
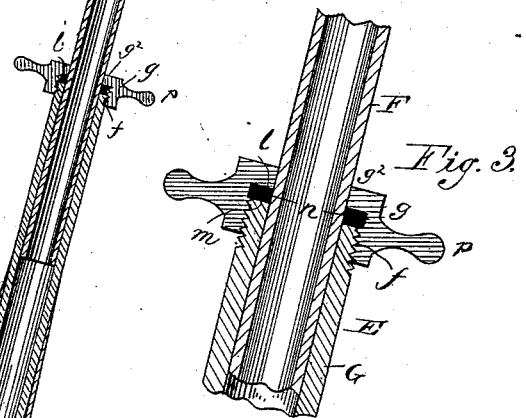
Witnesses:
W. Dean Overell
W. F. Bellow
Thomas F. Seery,
Inventor,
by Brown Bros.
Attorneys

UNITED STATES PATENT OFFICE.

THOMAS F. SEERY, OF BOSTON, MASSACHUSETTS.

FOUNTAIN OR HYDRAULIC BRUSH.

SPECIFICATION forming part of Letters Patent No. 352,009, dated November 2, 1886.

Application filed November 23, 1885. Serial No. 183,737. (No model.)

*To all whom it may concern:*

Be it known that I, THOMAS F. SEERY, of Boston, in the county of Suffolk and State of Massachusetts, have invented certain new and useful Improvements in Fountain or Hydraulic Brushes, of which the following is a full, clear, and exact description.

This invention relates to brushes particularly used for cleaning windows, &c., and to that class known as "fountain" or "hydraulic" brushes; and it consists in certain improvements therein, all as hereinafter described, and set forth in the clauses of claims.

In the accompanying plate of drawings the present improved brush is illustrated.

Figure 1 is a central vertical longitudinal section of the same. Fig. 2 is a section on line $x\,x$, Fig. 1. Figs. 3 and 4 are views in detail, enlarged, to be hereinafter referred to.

In the drawings, A represents the brush head or block, made of wood or other suitable material, preferably circular, and provided with bristles B, and, except as to certain features thereof hereinafter described, forming a part of this invention, the same as is ordinary in brushes.

D represents a reservoir casing or chamber at the back of the brush-block A, and its outer rim, $a$, overlaps the edge of and is secured to said block by screws $a^2$.

E represents the handle or rod of the brush, and, as shown, this handle E is made in two portions, F and G, the portion G being lowermost, telescoping the uppermost portion, F. Both of the portions F and G of the handle are made tubular, and the outer end of the handle portion G is provided with a screw-threaded or other suitable coupling for its attachment to a water-supply—such as a hose—and this coupling has a cock, $b$, by which to turn on and shut off the supply of water to the handle. The portion F of the handle at its upper end is in communication with the chamber or reservoir D of the brush-block.

The brush-block is provided with a series of perforations, $d$, leading from its front side, from which the bristles project to its rear side, and forming one wall of said reservoir or chamber D. These perforations are between the several tufts or bunches of bristles of the brush. A supply of water with suitable pressure entering the tubular handle E at $a^3$ and passing through the same to and into the reservoir D is finally forced from said chamber or reservoir through the perforations $d$ of the brush-block to and among the bristles B, and beyond same, and distributed (more or less) upon the glass or other surface being washed and brushed, as is plain.

The outermost and telescoping portion, G, of the handle, at its upper end, is provided with an external screw-thread, $f$, and a screw-threaded nut, $g$, having an inwardly-projecting flange, $g^2$, on its upper end, screws onto said screw-threaded portion $f$ of the part G of the handle, and against a washer, $l$, of rubber or other compressible and elastic material. By this nut the washer $l$ can be compressed against the end $m$ of the handle portion G, and also inwardly in a manner to cause its inner edge, $n$, to bear against the outer surface of the portion F of the handle, (see Figs. 2 and 3,) and thus to bind said portion F against movement.

The nut $g$ is provided with arms $p$, or is otherwise adapted for convenience in turning it, and when it is desired to lengthen or shorten the handle E the nut $g$ is first partially unscrewed on the screw-threaded part $f$ of the handle portion G, releasing the washer $l$ from its bearing and grip on the inner portion, F, of the handle, and thus freeing it to be moved up or down within the outer handle portion, G. The inner handle portion, F, can be again confined in its adjusted position and against movement or rotation by turning up the nut, as has been described.

The perforations through the brush-block A are preferably arranged in the manner shown in Fig. 2—that is, in and for the upper portion of the area of the brush-block—the lower portion of the brush-block not being provided with perforations, except the perforations to receive the brush-bristles, as usual. In this arrangement of perforations sufficient water is supplied for all purposes desired, and the brush-block is not weakened to any practical extent by its perforations.

The handle may be provided with an enlargement for a better grasp of the same, as at $r$, Fig. 1, which enlargement may be formed of sheet metal or of wood, or of any other suitable material. For convenience and practicability of construction and attachment of the parts making up the brush and handle thereof, and for the required durability, the portion F of the handle is made in two parts, F² and F³, joined by a coupling, t, the outer end of the part F³ screwing into a boss, u, of the chamber or reservoir casing D. Stays or rods H, suitably formed, are at one end, v, fastened by screws a², or otherwise, to the brush-block, and at their other ends, x, by screws or bolts y, secured to lugs Z or other suitable part of the coupling t. Thus the brush and its connection with its handle is made in a practical manner and most rigid and durable for use, all as is plain.

A brush constructed as described can in no way scratch or injure the surface being washed and cleaned by it. As it is desirable to use a more or less high pressure of water in the working of the brush, the perforations of the brush-block are made enlarged at their inner ends, and there each is provided with a metal ferrule or bushing, a⁴, for the purpose of preventing wear of the perforations by the friction of the water under pressure moving through them. The metal ferrules serve to stiffen the brush-head and to prevent it from warping or checking.

Having thus described my invention, I claim—

1. The combination, with a brush, A, provided with perforations a and having a chamber or reservoir, D, of a tubular handle, E, having a water-passage through it, its said passage communicating with said chamber or reservoir, said handle E made in parts F and G and adapted to telescope one part, G, on the other part, F, a nut, g, screwing on part G and compressing a washer, l, against part F, substantially as described, for the purpose specified.

2. The combination of a brush-head provided with perforations a and having a chamber or reservoir, D, provided with a tubular handle portion, F, in communication therewith, which is made of the straight part F² and the curved part F³, joined by a collar or coupling, t, and stays or rods H, passing between and secured to said brush-head and said collar or coupling, substantially as described, for the purpose specified.

In testimony whereof I have hereunto set my hand in the presence of two subscribing witnesses.

T. F. SEERY.

Witnesses:
 WM. S. BELLOWS,
 ALBERT W. BROWN.